(12) United States Patent
Hamilton

(10) Patent No.: US 11,980,131 B2
(45) Date of Patent: May 14, 2024

(54) SKID PLATE FOR SENSOR INTEGRATION

(71) Applicant: AGCO Corporation, Duluth, GA (US)

(72) Inventor: Kevin J. Hamilton, Newton, KS (US)

(73) Assignee: AGCO Corporation, Duluth, GA (US)

( * ) Notice: Subject to any disclaimer, the term of this patent is extended or adjusted under 35 U.S.C. 154(b) by 301 days.

(21) Appl. No.: 17/645,952

(22) Filed: Dec. 23, 2021

(65) Prior Publication Data
US 2022/0201936 A1    Jun. 30, 2022

Related U.S. Application Data

(60) Provisional application No. 63/131,332, filed on Dec. 29, 2020.

(51) Int. Cl.
A01D 67/00    (2006.01)
A01D 43/10    (2006.01)

(52) U.S. Cl.
CPC .......... *A01D 67/00* (2013.01); *A01D 43/107* (2013.01)

(58) Field of Classification Search
CPC .... A01D 41/141; A01D 67/00; A01D 43/107; A01D 34/00
See application file for complete search history.

(56) References Cited

U.S. PATENT DOCUMENTS

| | | | | |
|---|---|---|---|---|
| 4,141,200 A * | 2/1979 | Johnson | ............... | A01D 41/141 56/DIG. 15 |
| 6,845,326 B1 * | 1/2005 | Panigrahi | ........... | A01D 41/1277 356/73.1 |
| 7,222,474 B2 * | 5/2007 | Rayfield | ............... | A01D 41/141 56/10.2 E |
| 8,585,475 B2 * | 11/2013 | Isaac | ....................... | A01F 12/40 460/111 |
| 2003/0033792 A1 * | 2/2003 | Holtkotte | ............. | A01D 43/085 56/1 |
| 2006/0242935 A1 * | 11/2006 | Rayfield | ............... | A01D 41/141 56/10.2 E |
| 2007/0028553 A1 * | 2/2007 | Kirby | ....................... | A63C 5/06 52/202 |
| 2008/0264025 A1 * | 10/2008 | Ditchcreek | ............ | A01D 75/18 248/251 |
| 2013/0104508 A1 | 5/2013 | Ritter et al. | | |

(Continued)

FOREIGN PATENT DOCUMENTS

| | | | | |
|---|---|---|---|---|
| CA | 3037811 A1 * | 5/2018 | .......... | A01D 41/141 |
| CA | 3108290 A1 * | 8/2021 | .......... | A01B 79/005 |

(Continued)

OTHER PUBLICATIONS

Zhe Yin, Computers and Electronics in Agriculture, 2013, College of Water Resources & Civil Engineering, PR China, All pages (Year: 2013).*

(Continued)

*Primary Examiner* — Adam J Behrens
*Assistant Examiner* — Ashley A Kaercher

(57) ABSTRACT

In one embodiment, a skid plate comprising an upper surface and an opposing ground engaging surface, the ground engaging surface comprising one or more optical windows flush or extending beyond a plane of the ground engaging surface, each of the optical windows comprising an optically transparent material.

14 Claims, 10 Drawing Sheets

(56) References Cited

U.S. PATENT DOCUMENTS

| | | | | |
|---|---|---|---|---|
| 2013/0190061 | A1* | 7/2013 | Kirchbeck | A01F 15/0816 460/1 |
| 2015/0195991 | A1* | 7/2015 | Ricketts | A01D 34/03 56/249 |
| 2015/0253427 | A1* | 9/2015 | Slichter | G01S 7/4808 356/5.01 |
| 2015/0293068 | A1* | 10/2015 | Acheson | A01D 41/127 702/170 |
| 2016/0014963 | A1* | 1/2016 | Totten | A01D 43/107 56/208 |
| 2017/0020064 | A1* | 1/2017 | Doughty | A01G 25/09 |
| 2017/0020065 | A1* | 1/2017 | Ricketts | A01D 34/03 |
| 2017/0367251 | A1* | 12/2017 | Hamilton | A01C 7/203 |
| 2018/0260674 | A1* | 9/2018 | Hamilton | G06K 19/0723 |
| 2018/0260675 | A1* | 9/2018 | Hamilton | G06Q 50/02 |
| 2018/0295781 | A1* | 10/2018 | Hamilton | G09F 3/02 |
| 2019/0327893 | A1* | 10/2019 | Hamilton | A01D 41/141 |
| 2020/0128754 | A1* | 4/2020 | Hamilton | G06K 19/04 |
| 2020/0163282 | A1* | 5/2020 | Figger | A01F 15/042 |
| 2020/0375114 | A1* | 12/2020 | Hamilton | A01F 15/042 |
| 2021/0029877 | A1* | 2/2021 | Vandike | G01C 21/3837 |
| 2021/0127589 | A1* | 5/2021 | Hamilton | A01F 15/0875 |
| 2021/0195833 | A1* | 7/2021 | Hamilton | A01D 34/006 |
| 2021/0204482 | A1* | 7/2021 | Hamilton | G01N 1/04 |
| 2022/0053693 | A1* | 2/2022 | Gahres | A01D 41/145 |
| 2022/0061221 | A1* | 3/2022 | Good | A01D 89/006 |
| 2022/0063617 | A1* | 3/2022 | Good | A01F 15/0841 |
| 2022/0110246 | A1* | 4/2022 | Vandike | A01D 41/1277 |
| 2022/0110254 | A1* | 4/2022 | Vandike | G01C 21/3826 |
| 2022/0113725 | A1* | 4/2022 | Vandike | G01C 21/3841 |
| 2022/0113729 | A1* | 4/2022 | Vandike | A01D 41/141 |
| 2022/0201936 | A1* | 6/2022 | Hamilton | A01D 43/107 |
| 2022/0322600 | A1* | 10/2022 | Hamilton | A01C 15/006 |
| 2022/0346323 | A1* | 11/2022 | Hamilton | A01F 15/0825 |
| 2022/0377983 | A1* | 12/2022 | Honeyman | F01M 11/12 |
| 2023/0049727 | A1* | 2/2023 | Hamilton | A01D 43/085 |
| 2023/0055283 | A1* | 2/2023 | Hamilton | A01F 15/042 |
| 2023/0062392 | A1* | 3/2023 | Brokaw | A01D 41/141 |
| 2023/0066442 | A1* | 3/2023 | Hamilton | G01N 21/84 |
| 2023/0105797 | A1* | 4/2023 | Füchtling | A01B 63/004 701/50 |
| 2023/0270043 | A1* | 8/2023 | Dugas | A01D 34/006 56/10.2 E |
| 2023/0309437 | A1* | 10/2023 | Palla | A01B 79/005 701/50 |
| 2023/0341322 | A1* | 10/2023 | Hamilton | A01F 15/04 |
| 2023/0345878 | A1* | 11/2023 | Hamilton | A01D 57/26 |
| 2023/0358707 | A1* | 11/2023 | Honeyman | A01D 41/1271 |
| 2023/0363306 | A1* | 11/2023 | Cook | A01D 34/243 |

FOREIGN PATENT DOCUMENTS

| | | | | |
|---|---|---|---|---|
| CA | 3131477 | A1 * | 4/2022 | A01D 41/141 |
| CA | 3186458 | A1 * | 9/2023 | A01D 41/06 |
| CN | 108934436 | A * | 12/2018 | A01D 45/10 |
| CN | 114303599 | A * | 4/2022 | A01D 41/127 |
| DE | 102017114281 | A1 * | 12/2018 | A01B 59/064 |
| DE | 102021119856 | A1 * | 4/2022 | A01D 41/127 |
| DE | 102021124364 | A1 * | 4/2022 | A01D 41/127 |
| EP | 1166619 | A1 * | 1/2002 | A01D 43/086 |
| EP | 1356729 | A1 * | 10/2003 | A01D 41/127 |
| EP | 1360891 | A1 * | 11/2003 | A01D 43/085 |
| EP | 1374661 | A1 * | 1/2004 | A01D 41/141 |
| EP | 1671530 | A1 * | 6/2006 | A01D 43/085 |
| EP | 2098109 | A1 * | 9/2009 | A01D 43/085 |
| EP | 2474220 | A1 * | 7/2012 | A01D 41/141 |
| EP | 2288250 | B1 * | 10/2013 | A01D 41/141 |
| EP | 2810550 | A1 * | 12/2014 | A01D 43/14 |
| EP | 2816433 | A2 * | 12/2014 | A01D 34/008 |
| EP | 2896282 | A1 * | 7/2015 | A01D 34/008 |
| EP | 3607815 | A1 * | 2/2020 | A01B 63/111 |
| EP | 3821693 | A1 * | 5/2021 | A01D 41/127 |
| EP | 3837945 | A1 * | 6/2021 | A01B 79/005 |
| EP | 3837946 | A1 * | 6/2021 | A01B 79/005 |
| EP | 4256944 | A1 * | 10/2023 | A01D 41/141 |
| WO | WO-2010003421 | A1 * | 1/2010 | A01B 79/005 |
| WO | WO-2018091958 | A1 * | 5/2018 | A01D 41/141 |
| WO | WO-2022003457 | A1 * | 1/2022 | A01D 41/127 |
| WO | WO-2022046769 | A1 * | 3/2022 | A01D 34/006 |

OTHER PUBLICATIONS

Sensortech Systems Inc., Sled Moisture Sensor, 2018, Unknown: Publisher and Edition, whole page (Year: 2018).*

UK Intellectual Property Office, Search report for related UK Application No. GB2100404.9, dated Jul. 9, 2021.

* cited by examiner

SKID PLATE FOR SENSOR INTEGRATION

CROSS REFERENCE TO RELATED APPLICATION

This application claims the benefit of U.S. Provisional Application No. 63/131,332, filed Dec. 29, 2020, which is hereby incorporated by reference in its entirety.

TECHNICAL FIELD

The present disclosure is generally related to agricultural headers and, more particularly, agricultural headers with skid plates.

BACKGROUND

Harvesting forage crops when soil is at an optimum level of moisture is important to achieve rapid forage dry-down. If the crop is swathed and placed onto moist soil, dry-down time is negatively affected. Additionally, operating harvesting equipment on soils with excess moisture leads to compaction and/or stand damage, which can have negative, long term consequences (e.g., in terms of yield), especially in perennial crops such as alfalfa.

BRIEF DESCRIPTION OF THE DRAWINGS

Many aspects of certain embodiments of a skid plate can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
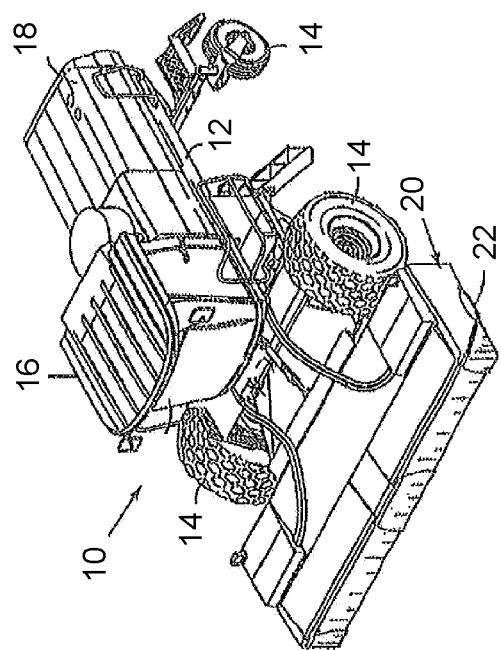
FIG. 1 is a schematic diagram that illustrates, in front perspective view, an example machine in which an embodiment of a skid plate may be implemented.

In one embodiment, a skid plate comprising an upper surface and an opposing ground engaging surface, the ground engaging surface comprising one or more optical windows flush or extending beyond a plane of the ground engaging surface, each of the optical windows comprising an optically transparent material.

DETAILED DESCRIPTION

Certain embodiments of a skid plate, a header equipped with one or more of the skip plates, and skid plate sensor system are disclosed. In one embodiment, the skid plate comprises an optical window flush with, or in a protrusion extending beyond a plane of, a main skid plate surface. The skid plate is configured to secure an optical sensor to an upper side of the skid plate. The optical sensor is configured to transmit light, and receive reflected light, through the optical window. In effect, the skid plate comprises an integrated optical sensor or sensors. In one embodiment, one or more of these skid plates with integrated optical sensors are coupled to a header. The header may be detachably coupled to an agricultural machine, such as a windrower (swather) that receives the cut crop material from the header and forms a swath or windrow onto the field for dry-down and subsequent collection. In some embodiments, the windrower and header comprise a skid plate sensor system that comprises the skid plate optical sensors configured to detect one or more parameters that a controller processes to provide moisture sensor values, among other information, that may be useful in improving dry-down of the windrow and/or yield (e.g., dry tonnage), and a control system. For instance, the control system receives information about moisture detected in the soil by the skid-integrated moisture sensors, and provides feedback and/or recommendations to the operator and/or other farm personnel to enable informed decisions on swathing operations. In some embodiments, the moisture information may be used to trigger machine operation or setting adjustments automatically or semi-automatically (e.g., using operator intervention).

Digressing briefly, existing methods of soil sensing may use optical methods that are separated by a distance from the soil, which may expose the signals to ambient light and potentially corrupt the signals. Some sensors may physically contact the soil, but use bulky equipment for securing the sensors and/or require a preliminary trenching operation to expose the sensors to a suitable depth. Further, the harsh conditions of regular ground engagement by the sensors may lead to low life expectancies for the sensors, requiring frequent replacement. In contrast, certain embodiments of a skid plate and associated systems and devices enable the detection of soil parameters at surface or sub-surface depths without bulky equipment, while protecting the optical sensors from excessive wear, resulting in longer life and fewer sensor replacements.

Having summarized certain features of a skid plate that is designed for sensor integration and associated systems and devices, reference will now be made in detail to the description of a skid plate and associated systems and devices as illustrated in the drawings. While an example skid plate and associated systems and devices will be described in connection with these drawings, there is no intent to limit it to the embodiment or embodiments disclosed herein. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Reference is made to FIG. 1, which illustrates an example agricultural machine for which an embodiment of a skid plate (e.g., whether using a single or plural skid plates) may be implemented. One having ordinary skill in the art should appreciate in the context of the present disclosure that the example agricultural machine, depicted in FIG. 1 as a self-propelled windrower 10, is merely illustrative, and that pull-type windrowers may be used in some embodiments. The windrower 10 is operable to mow and collect standing crop in the field, condition the cut material as it moves through the machine to improve its drying characteristics, and then return the conditioned material to the field in a windrow or swath. The windrower 10 may include a chassis 12 supported by wheels 14 (although tracks may be used in some embodiments, or other configurations in the number and/or arrangement of wheels may be used in some embodiments) for movement across a field to be harvested. The chassis 12 supports a cab 16, within which an operator may control or activate certain operations of the windrower 10 and/or implement attachments (e.g., including header lift, float setting, skid plate adjustment, forming shield adjustment, etc.), and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art. In some embodiments, other mechanisms for enabling navigation and/or traversal of the field may be used.

A coupled working implement, depicted in FIG. 1 as a harvesting header 20 (or simply, header), is supported on the front of the chassis 12 using a hydraulic float assembly. The header 20 may be configured as a modular unit and consequently may be disconnected for removal from the chassis 12. As is known in the art, the header 20 has processing components on an upper side of the header 20 (e.g., a laterally extending crop cutting assembly 22 in the form of a low profile, rotary style cutter bed located adjacent the front of the header 20) for severing crop from the ground as the windrower 10 moves across a field. One skilled in the art will understand that other types of crop cutting assemblies 22, such as sickle style cutter beds, may also be used in some embodiments.

Figure 2:
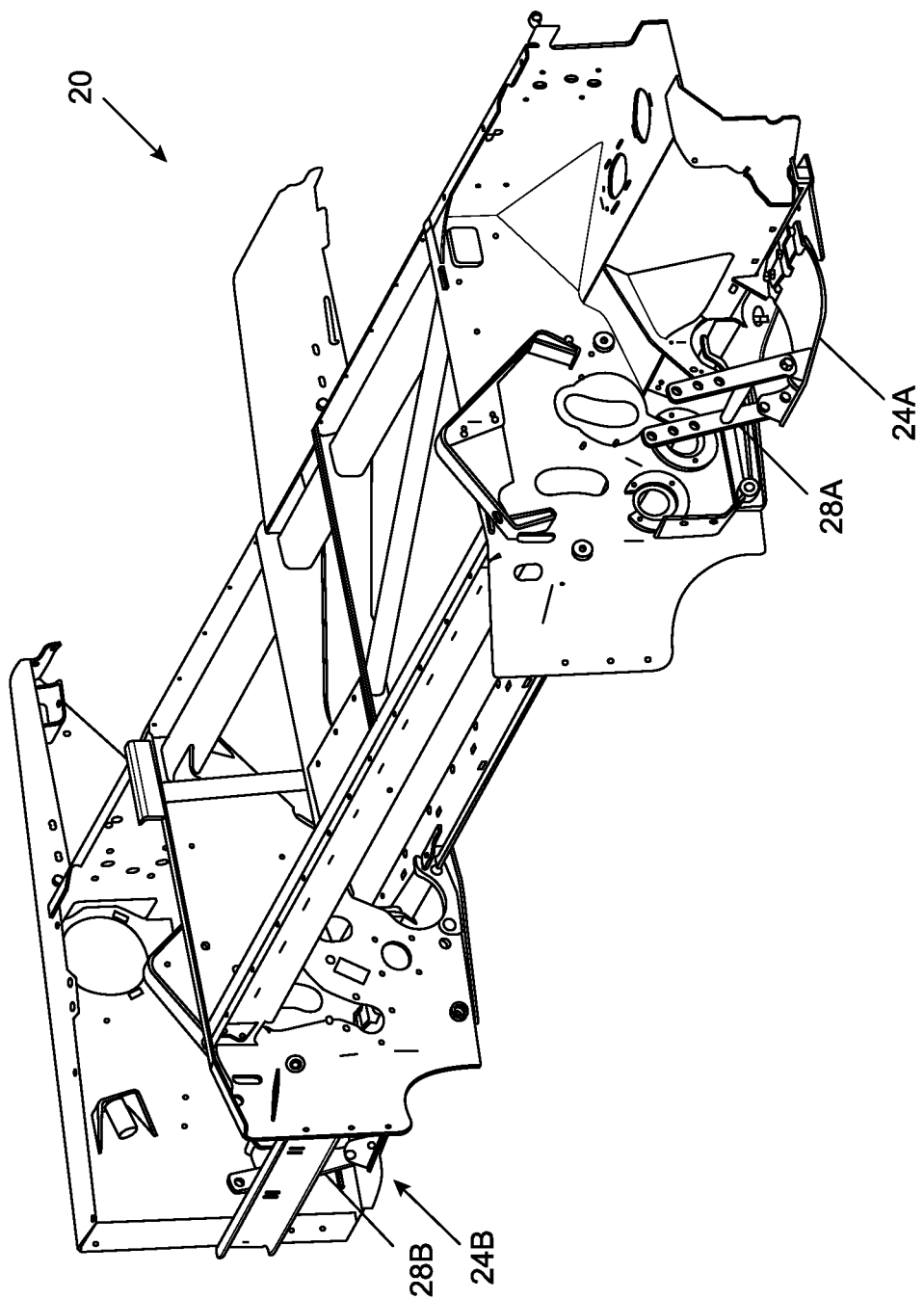
FIG. 2 is a schematic diagram that illustrates, in fragmentary, rear isometric view, an example header comprising an embodiment of an example skid plate.

Beneath the header 20 are plural skid plates 24 (e.g., 24A, 24B, where 24B is partially shown and hence largely obscured from view), as best shown in FIG. 2. Note that two skid plates 24 are shown arranged toward the rear or back end of the header 20, though in some embodiments, fewer or more skid plates may be used and/or their placement location along the header 20 different than that depicted in FIG. 2. In one embodiment, the skid plates 24 are coupled to a lower portion of a frame 26 of the header 20 via brackets 28 (e.g., 28A, 28B, with 28B partially obscured from view). In the depicted embodiment, the skid plates 24 are laterally disposed on opposing sides of the header 20. The brackets 28 comprise slots (or generally, opening) that enable coupling the to the header frame 26 at different heights, enabling adjustment of the skid plates 24 relative to the bottom of the header 20. The skid plates 24 extend at least partially underneath the frame 26 of the header 20. In one embodiment, the skid plates 24 comprise a curvilinear shape, thus having a similar shape to most existing skid plates. Note that other geometrical shapes may be used in some embodiments. The skid plates 24 help to reduce the drag of the header, protect the bottom of the header surface from wear, and set the height of the header 20 as it rests on the ground. As general operations of a windrower 10 and header 20 are known to those having ordinary skill in the art, further description of the same is omitted here for brevity.

Figure 3A:
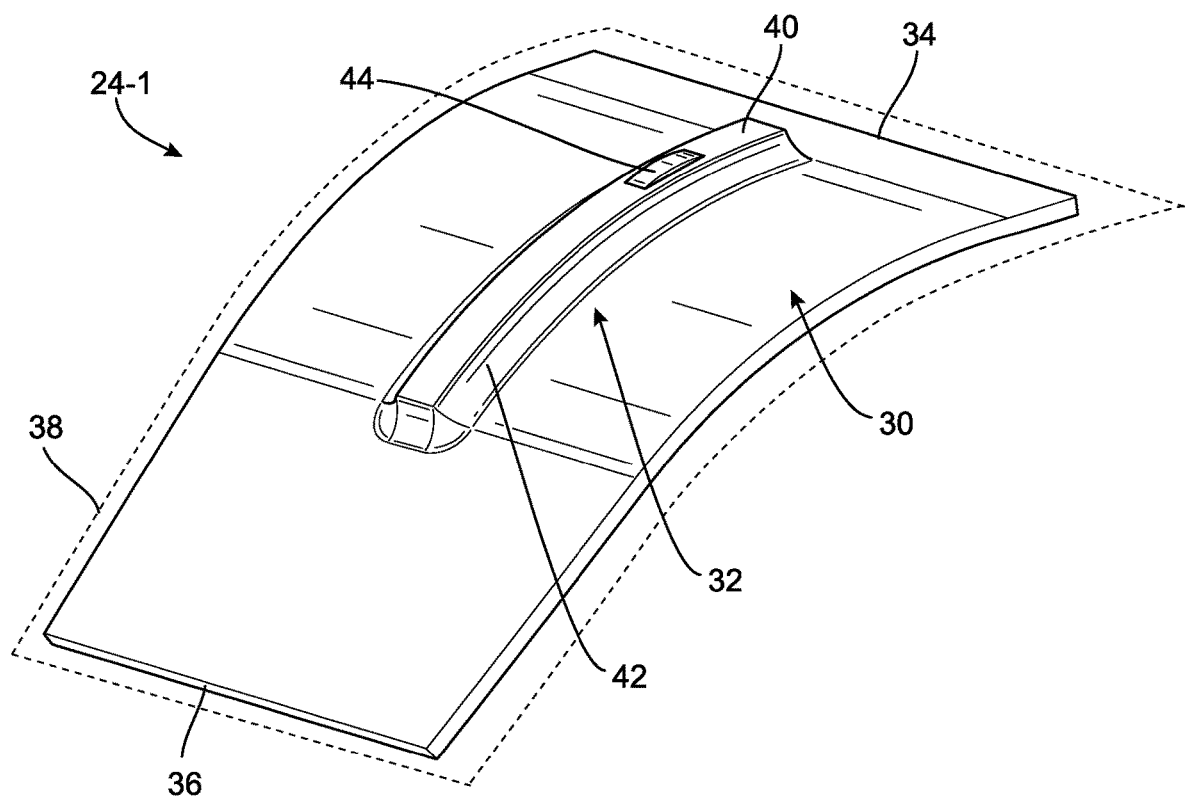
FIGS. 3A-3B are schematic diagrams that illustrate, in fragmentary, bottom isometric view, one embodiment of an example skid plate where one or more optical windows are arranged in a protrusion of the skid plate.
Figure 3B:
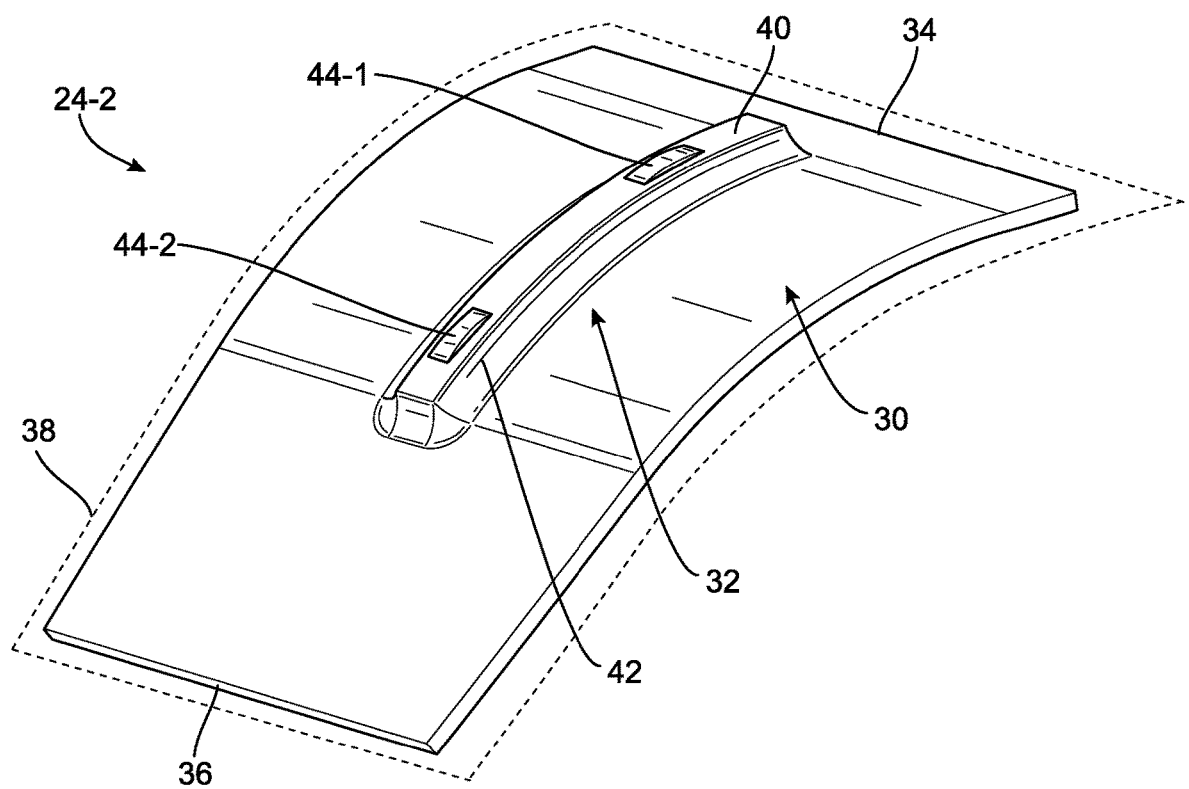

Attention is directed to FIGS. 3A-3B, which show in fragmentary bottom isometric views, certain embodiments of the skid plate 24. That is, certain portions of the skid plate 24 are omitted to emphasize more germane features. Referring to FIG. 3A, shown is skid plate 24-1 in bottom view. In one embodiment, the skid plate 24-1 comprises a curvilinear, ground-engaging surface partitioned into a main surface 30 and a fin or protrusion 32. Note that a single protrusion 32 is shown, though in some embodiments, more than one protrusion 32 may be used per skid plate 24. The skid plate 24-1 may be comprised of a polymer material (e.g., plastic) or metal, or a combination of both. The skid plate 24-1 comprises a front or forward end 34 and a rearward or back end 36. The front end 34 comprises the leading end of the skid plate 24-1 when the windrower 10 is traveling in the forward direction. The main surface 30 is coincident with a plane 38 (shown in dashed lines extending from all edge sides of the periphery of the skid plate 24-1). The protrusion 32 comprises a hollow or at least partially hollow structure that extends beyond the main surface 30. The protrusion 32 may be formed along with the main surface 30 as part of molding or cast operation, or in some embodiments, fixedly attached (e.g., welded, adhesive bonded, bolted, screws, etc.). In the depicted embodiment, the protrusion 32 comprises a substantially planar surface 40 that is in a plane parallel to the plane 38, and side walls 42 that join the planar surface 40 to the main surface 30. The protrusion 32 is depicted in FIG. 3A to be centrally located between opposing sides, and longitudinally arranged (e.g., from front end 34 to back end 36) yet extending along only a portion of the length between the two ends 34, 36. The length of the protrusion 32 in one embodiment may be approximately two-thirds of the length between ends 34, 36, though other lengths may be used. The width of the protrusion 32 may be sufficient to accommodate one or more optical sensors disposed within a chamber or volume formed by the protrusion 32. The depth or extent to which the protrusion 32 extends beyond the plane 38 may range from approximately 0.25 to 1.0 inches (e.g., 6.35 millimeters (mm) to 25.4 mm), which is sufficient to enable a determination of sub-surface soil moisture by optical sensors located therein as explained further below. Other ranges may be used in some embodiments.

In one embodiment, the planar surface 40 comprises one or more optical windows 44 (one shown) comprised of a material that is transparent to light (e.g., infrared light transmitted from one or more sensors and reflected from the soil) and sufficiently robust for the rigor of applications where the optical window 44 is often driven into the soil. In one embodiment, the optical window 44 is comprised of sapphire quartz, which has excellent optical transparency and abrasion resistance properties. In some embodiments, other types of robust, optically transparent materials may be used, including fused quartz, fused silica glass, borosilicate glass, among other known materials. In one embodiment, the optical window surface is flush or substantially flush with the planar surface 40. The size of the optical windows 44 and/or quantity of optical windows 44 disposed on the planar surface 40 is of course constrained in part by the dimensions of the planar surface 40, and its design dimensions also depends on the intended application and goals of detection. In one embodiment, the optical windows 44 are used to facilitate the detection of moisture and/or other soil parameters (e.g., temperature, nutrient content, etc.) through operations of one or more sensors transmitting light through the optical window 44 and receiving reflected light from the soil. A single sensor or plural sensors may be used to transmit/receive light through a single optical window 44. In some embodiments, plural optical windows 44 disposed at various locations along the planar surface 40 may be used to obtain sensor readings from spaced apart sensors or sets of sensors, where the sensor readings may be averaged or otherwise processed (e.g., at a controller or electronic control unit (ECU) or processing chip integrated with the sensors in some embodiments). For instance, FIG. 3B shows another embodiment of a skid plate 24-2 that is similarly configured to skid plate 24-1 (FIG. 3A), except with two optical windows 44 (e.g., 44-1, 44-2) spaced apart to be, in this example arrangement, substantially proximal to opposing ends of the protrusion 32. Like numbered components have been described above for FIG. 3A, and hence are omitted here for brevity. The quantity and/or arrangement of the optical windows 44 on the planar surface 40 may differ than the arrangements depicted in FIGS. 3A-3B in some embodiments. For instance, in some embodiments, the optical windows 44 may be disposed in the side walls.

Figure 4A:
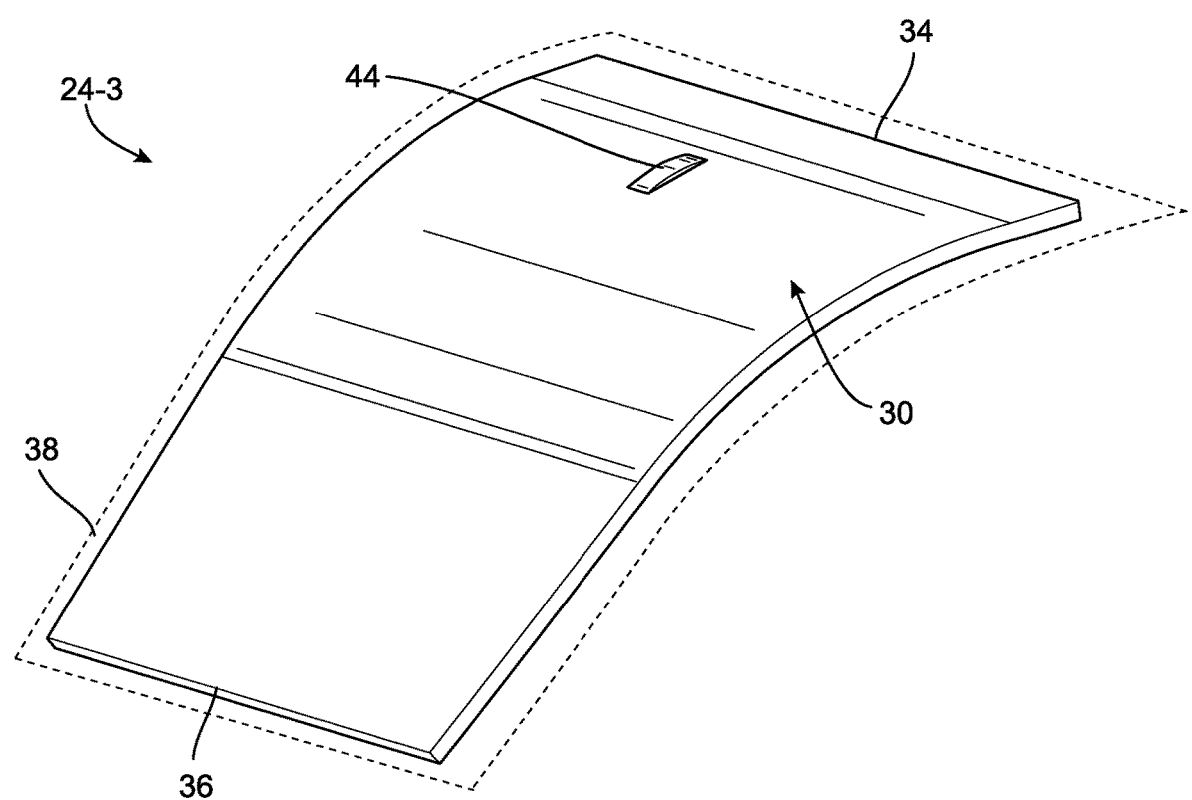
FIGS. 4A-4C are schematic diagrams that illustrate, in fragmentary, bottom isometric view, another embodiment of an example skid plate where one or more optical windows are arranged in a surface of a skid plate.
Figure 4B:
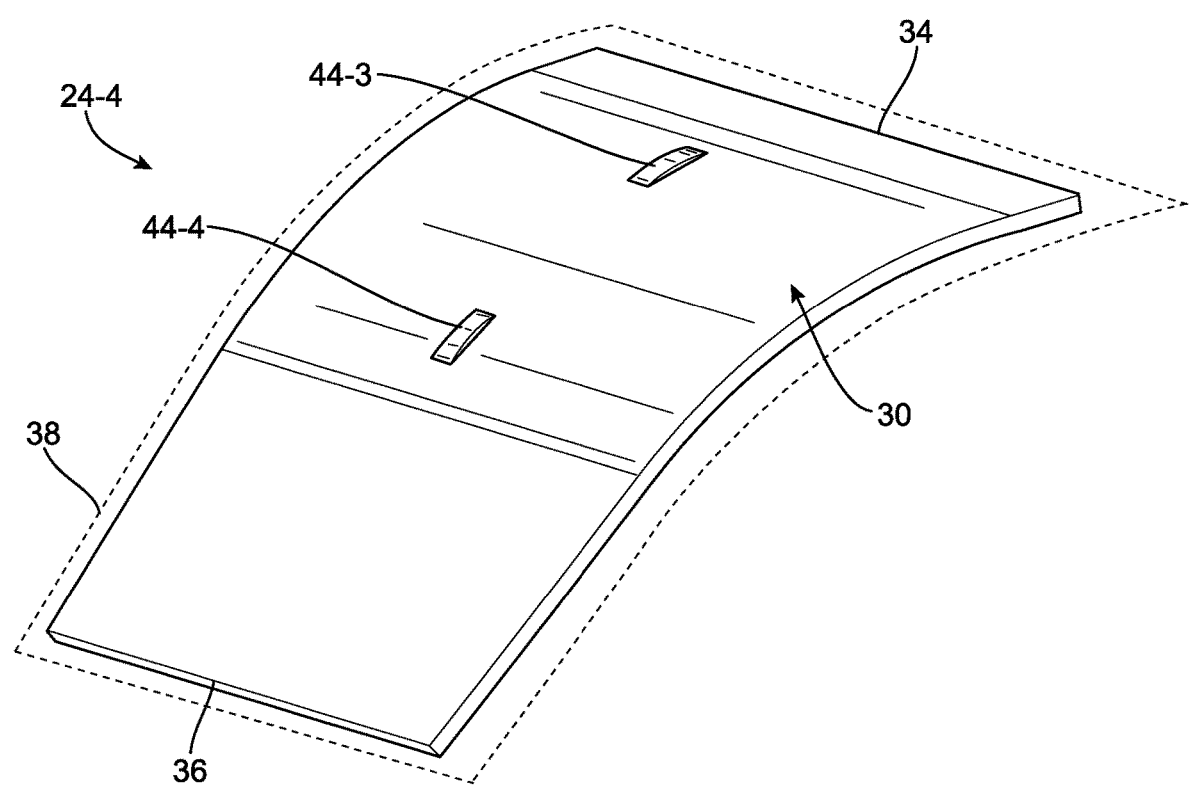
Figure 4C:
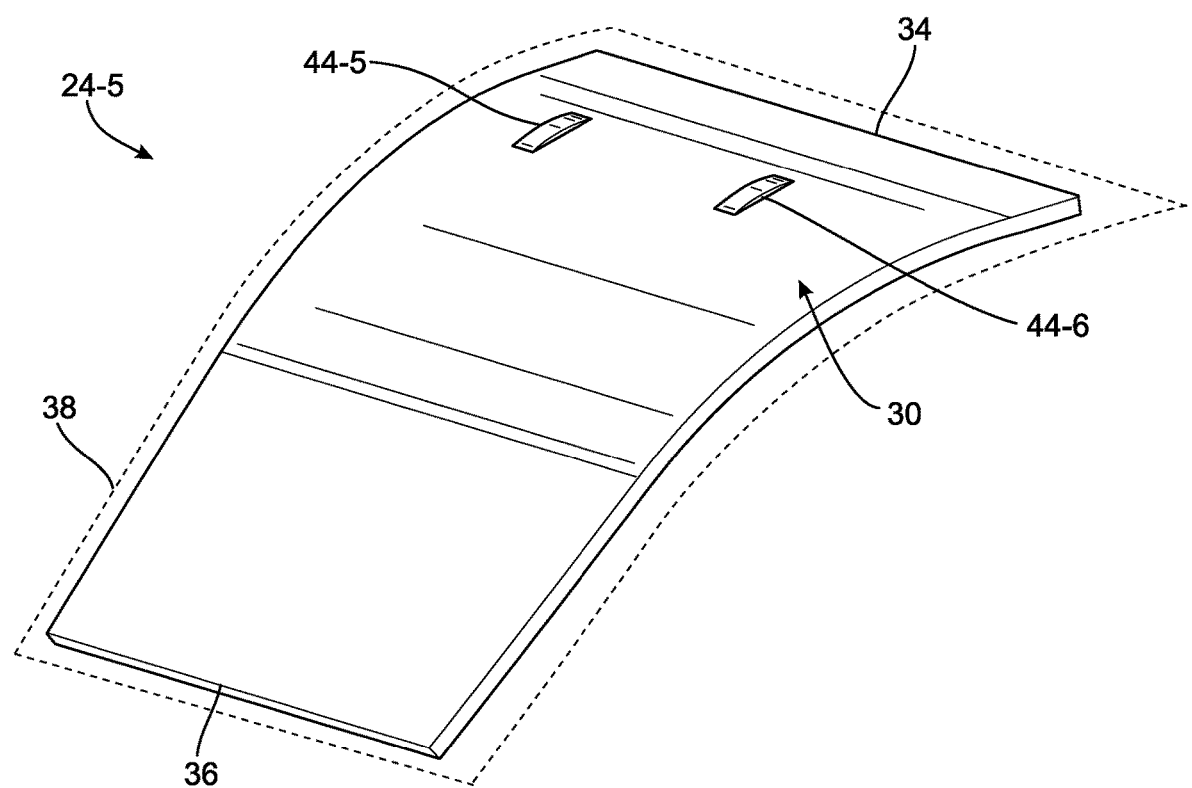

Referring to FIGS. 4A-4C, shown are embodiments of a skid plate 24-3, 24-4, and 24-5 that that comprise the optical window or windows 44 disposed in (e.g., flush or approximately flush with) the main surface 30 (and hence, in-plane 38). In other words, the skid plates 24-3, 24-4, and 24-5 omit the protrusion 32. Description of features corresponding to like numbered reference numerals are omitted here except where noted below. Referring to FIG. 4A, shown is the single optical window 44 disposed in the main surface 30, coincident with the plane 38, of the skid plate 24-3. Though disposed in a similar location in the skid plate 24-3 to that shown in FIG. 3A, which is coincident with a desired ground engagement location for the skid plate 24-3 based on the curvature, it should be appreciated by one having ordinary skill in the art that the optical window 44 may be located elsewhere on the skid plate 24-3 in some embodiments. FIG. 4B shows an arrangement of the optical windows 44-3 and 44-4 for skid plate 24-4 that is similar to that shown in FIG. 3B. FIG. 4C shows a different arrangement of the optical windows 44-5 and 44-6 for skid plate 24-5, where the optical windows 44-5 and 44-6 are spaced laterally apart along approximately the same longitudinal dimension as that shown for the single optical window 44 in FIG. 4A. These plural windows 44 in different arrangements may enable redundancy and/or averaging of sensor signals. FIGS. 3A-4C merely provide illustrations of different arrangements of the optical windows 44 in the skid plate 24, and other quantities of optical windows 44 and/or locations within the skid plate may be used and hence are contemplated to be within the scope of the disclosure.

Figure 5:
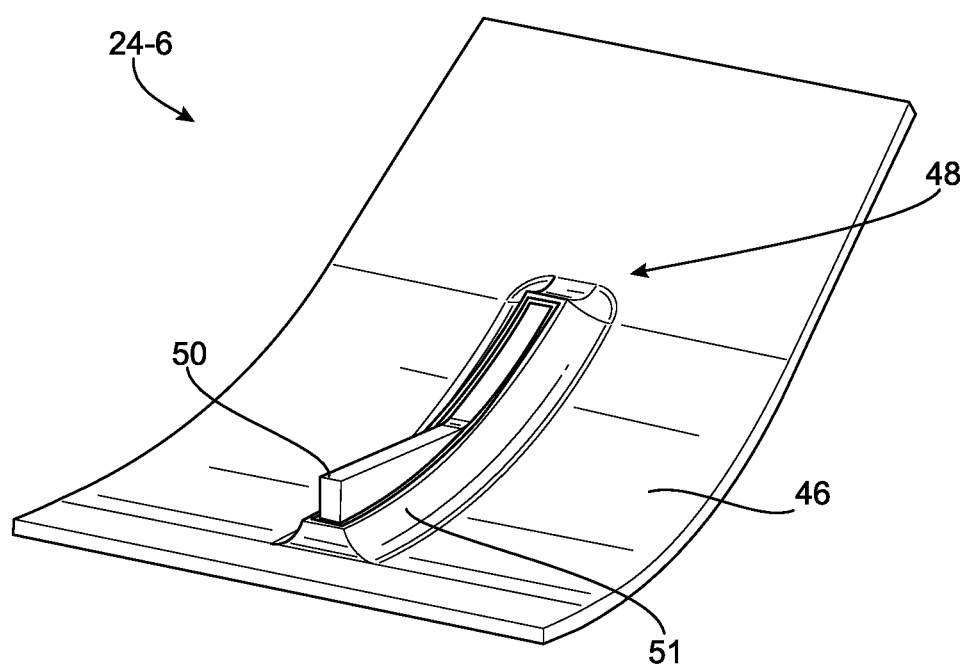
FIG. 5 is a schematic diagram that illustrates, in fragmentary top isometric view, one embodiment of an example skid plate.

With continued reference to FIGS. 3A-4C, attention is now directed to FIG. 5, which illustrates, in fragmentary top isometric view, one embodiment of an example skid plate 24-6. In particular, the skid plate 24-6 shows the upper or top side (non-ground engaging side) of the skid plate. The skid plate 24-6 may be, for instance, the upper side of skid plates 24-1 through 24-4 of FIGS. 3A-4B, and with slight modification (e.g., based on the location of the optical windows 44), may be the upper side of skid plate 24-5 of FIG. 4C. The skid plate 24-6 comprises an upper surface 46 having a curvature that conforms to or mirrors that of the ground engaging surface. In the depicted embodiment, the skid plate 24-6 comprises a socket or cradle 48 that comprises an interior volume sufficient to accept one or more sensors 50. The socket 48 comprises an elongated, rectangular structure with an open end to receive the one or more sensors 50 and an opposing end that at least in part is bounded by the one or more optical windows 44. In other words, by alignment of the one or more sensors 50, occupying the volume of the socket 48, with one or more optical windows 44, the sensors 50 may transmit light and receive reflected light (from the soil) through the optical window. The sensor(s) 50 may be secured in the socket 48 by use of an epoxy or other sealant that further serves to protect or seal the electronics of the sensor(s) 50 from the harsh environment and/or weather. The socket 48 further comprises side walls 51 that join the socket 48 to the upper surface 46. In embodiments having the protrusion 32, the length and width of the socket 48 may be somewhat similar to that of the protrusion 32, though not necessarily so. In general, the socket 48 is suitably dimensioned to accept optical sensors 50 of the desired quantity and type. The socket 48 may be formed in the skid plate fabrication process (e.g., molded, cast, forged), or fixedly attached as similarly described above for the protrusion 32. As indicated above, the skid plate 24-6 may comprise the upper side of the skid plate ground engaging surfaces shown in skid plates 24-1 through 24-4 of FIGS. 3A-4B. Another socket similar to that shown in FIG. 5 (or of different dimensions) may be added and arranged to correspond to respective windows 44-5 and 44-6 in the skid plate 24-5 of FIG. 4C.

In one embodiment, the sensor(s) 50 comprise infrared or near-infrared sensors that are configured to measure electromagnetic waves generated by one or more emitters (e.g., light-emitting diodes) and reflected from the soil surface or sub-surface and received by one or more photodetectors. In one embodiment, the sensors 50 serve as a moisture sensor, though in some embodiments, the sensor technology may be used to sense other and/or additional parameters, including temperature, chemical composition, etc. of the soil. In one embodiment, the sensors 50 may emit and receive reflected light from a broad spectrum covering a range of wavelengths or in some embodiments, receive reflected light associated with plural discrete wavelengths. For instance, multiple (e.g., three) narrow band photodetectors may be used to receive the reflected light from a single light source through a single optical window 44. In some embodiments, multiple light sources may be used, or in some embodiments, a dedicated photodetector used per light source using plural optical windows 44. There may be a variety of transmit and receive combinations using one or a plurality of optical windows 44, as should be appreciated by one having ordinary skill in the art in the context of the present disclosure. In one embodiment, the sensors 50 may be fabricated using microelectromechanical systems (MEMS) technology.

In general, the skid plates 24 (or in some embodiments, one of them) each incorporate one or more soil moisture sensors 50. By using the floatation skid plates or shoes of, say, the headers 20 used for a windrower 10 that harvests most forage crops, the sensor(s) 50 are protected from damage or signal corruption while using the weight of the header 20 to press the sensor(s) 50 at the desired depth into the soil. By pressing the sensor(s) 50 into the soil, a distinct advantage is gained over conventional non-contact solutions (e.g., optical sensing such as IR or near IR sensing) because potential crop and/or light interference is removed, while the ability to measure more than the top 2-3 mm of soil is achieved, which can be desirable as soil moisture lower than 2-3 mm can effect both dry down and compaction.

Digressing briefly, an increase in soil moisture results in a decreased ability of the soil to support the weight of the harvesting equipment. For instance, the forces imposed by the harvesting equipment tends to remove air gaps and/or soil support structures, which in turn may limit root growth and water movement (which may reduce yield) or harm overall plant health. Further, soil moisture also impacts dry-down time. The windrow, when deposited on wet soil, in effect results in the windrow locking the moisture in between the soil and the windrow (e.g., a moisture barrier is created). That is, the normal challenges in drying the windrow are further compounded by the moisture from the soil evaporating into the windrow, where if not managed properly, may result in regrowth and further damage to a crown structure of the plant by the equipment. On the other hand, for arid environments, monitoring of the soil moisture helps to make informed decisions on when irrigation can be continued. Existing techniques for determining soil moisture are largely subjective, often based on an operator walking out to the field and assessing, through touch, the condition of the crop. In contrast, certain embodiments of a skid plate and associated systems and devices provide objectivity to the determination of moisture content of the soil, which is information that may be used to limit soil compaction and minimize dry down time. Additionally, due to the telemetry capabilities of today's equipment (or even through the use of an operator's smart phone), the data corresponding to the moisture content may be provided to a remote location (e.g., to a farm manager managing large crews), enabling informed decisions on whether to commence or continue harvesting operations for one or more fields. This feature is particularly important for farms having acreage that spans hundreds of miles using many crews and several machines (e.g., 5-10 windrowers). Further, in the short term, sensing of soil moisture content may provide an output that is used by the machine controls to signal alerts and/or recommendations to the operator (e.g., the soil is too moist warnings) and/or enable machine adjustments, with or without operator intervention, including travel speed of the windrower, forming shield adjustment, cutting speed adjustment, etc.

Figure 6A:
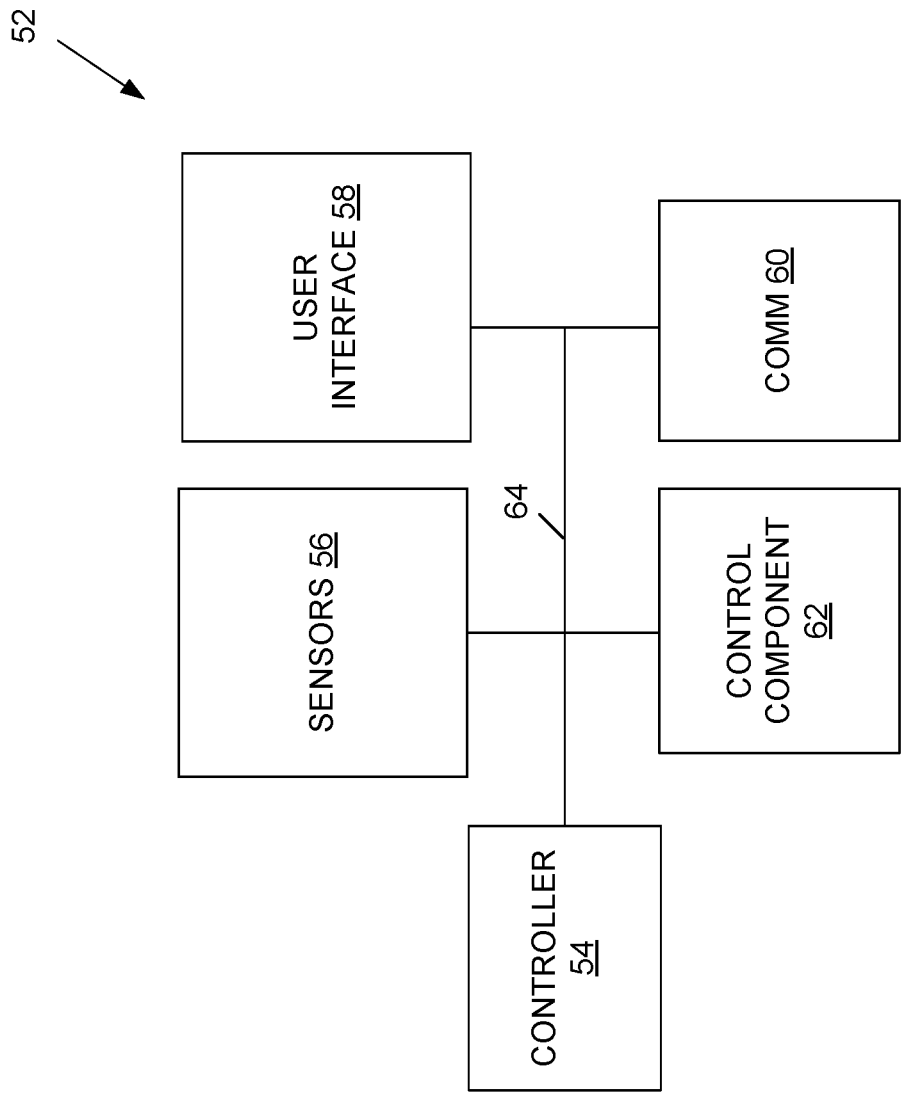
FIG. 6A is a block diagram that illustrates an embodiment of an example control system.

Having described some example embodiments of a skid plate 24 and header 20 comprising one or more skid plates 24, reference is made to FIG. 6A, which shows an embodiment of an example control system 52 that may be implemented in the windrower 10 (FIG. 1). It should be appreciated within the context of the present disclosure that some embodiments may include additional components or fewer or different components, and that the example depicted in FIG. 6A is merely illustrative of one embodiment among others. Further, though depicted as residing entirely within the windrower 10, in some embodiments, the control system 52 may be distributed among several locations. The control system 52 comprises a controller 54. Though described below as residing in the windrower 10, in some embodiments, functionality of the controller 54 may reside entirely, or at least partly, at a remote computing device, such as a server that is coupled to the control system components over one or more wireless networks (e.g., in wireless communication with the windrower 10 via a radio frequency (RF) and/or cellular modems residing in the windrower 10 or enabled using an operator's smart phone). Further, though depicted using a single controller 54, in some embodiments, the control system 52 may be comprised of plural controllers. In the depicted embodiment, the controller 54 is coupled to and/or in communication with sensors 56, a user interface (UI) 58, a communications interface 60, and control components 62 via one or more networks, such as network 64 (e.g., a CAN network or other network, such as a network in conformance to the ISO 11783 standard, also referred to as "Isobus"). Note that control system operations are primarily disclosed herein in the context of control via the single controller 54, with the understanding that additional controllers may be involved in one or more of the disclosed functionality in some embodiments.

The sensors 56 include the sensors utilized by the windrower 10 and the header 20, including the optical sensors 50 described above and integrated in the skid plates 24. In addition to the IR or near IR sensors described above for the optical sensors 50, other sensing technology that may be used to sense machine and/or header functions include one or any combination of contact (e.g., electromechanical sensors, such as position sensors, strain gauges, pressure sensors, distance measurement, etc.) and non-contact type sensors (e.g., photo-electric, inductive, capacitive, ultrasonic, etc.), all of which comprise known technology. Additional sensors 56 may include navigational sensing, including a global navigation satellite system (GNSS) receiver and/or inertial components, including gyroscopes, accelerometers, etc.

The user interface 58 may include one or more components, including one or any combination of a keyboard, mouse, microphone, touch-type or non-touch-type display device (e.g., display monitor or screen), joystick, steering wheel, FNR lever, and/or other devices (e.g., switches, immersive head set, etc.) that enable input and/or output by an operator. For instance, in some embodiments, the user interface 58 may be used to present plural user-selectable skid plate height adjust settings for the operator to choose from, or the user interface 58 may provide feedback of when the header float position has changed (or recommendations to change) during operation and/or when pressure on the skid plates 24 is beyond recommended levels. In some embodiments, the user interface 58 may include a display screen that provides feedback and/or recommendations to the operator pertaining to moisture levels detected by the optical sensors 50, among other parameters that may be sensed by the optical sensors 50.

The communications interface 60 comprises a wireless network interface module (e.g., including an RF or cellular modem) for wireless communication among other devices of the windrower 10 or other communication devices located remote and/or external from the windrower 10. The communications interface 60 may work in conjunction with communication software (e.g., including browser software) in the controller 54, or as part of another controller coupled to the network 64 and dedicated as a gateway for wireless communications to and from the network 64. The communications interface 60 may comprise MAC and PHY components (e.g., radio circuitry, including transceivers, antennas, etc.), as should be appreciated by one having ordinary skill in the art.

The control components 62 comprise components used to control operations of the windrower 10 and/or header 20 (or components thereof). The control components 62 may regulate fluid (e.g., hydraulic fluid) flow for control of header operations (e.g., header height, tilt, skid plate, and rotary speed adjustment) and machine operations (e.g., forming shield adjustments, steering, travel speed, etc.) using in at least some instances control valves in combination with hydraulic actuators. In some embodiments, other mechanisms for control may be used, including control based on electric or electromagnetic or magnetic devices, pneumatic control, or solar control. The control component 62 may comprise control valves, motors/motor control logic, air valves, solenoids, among other controlling devices or components.

Figure 6B:
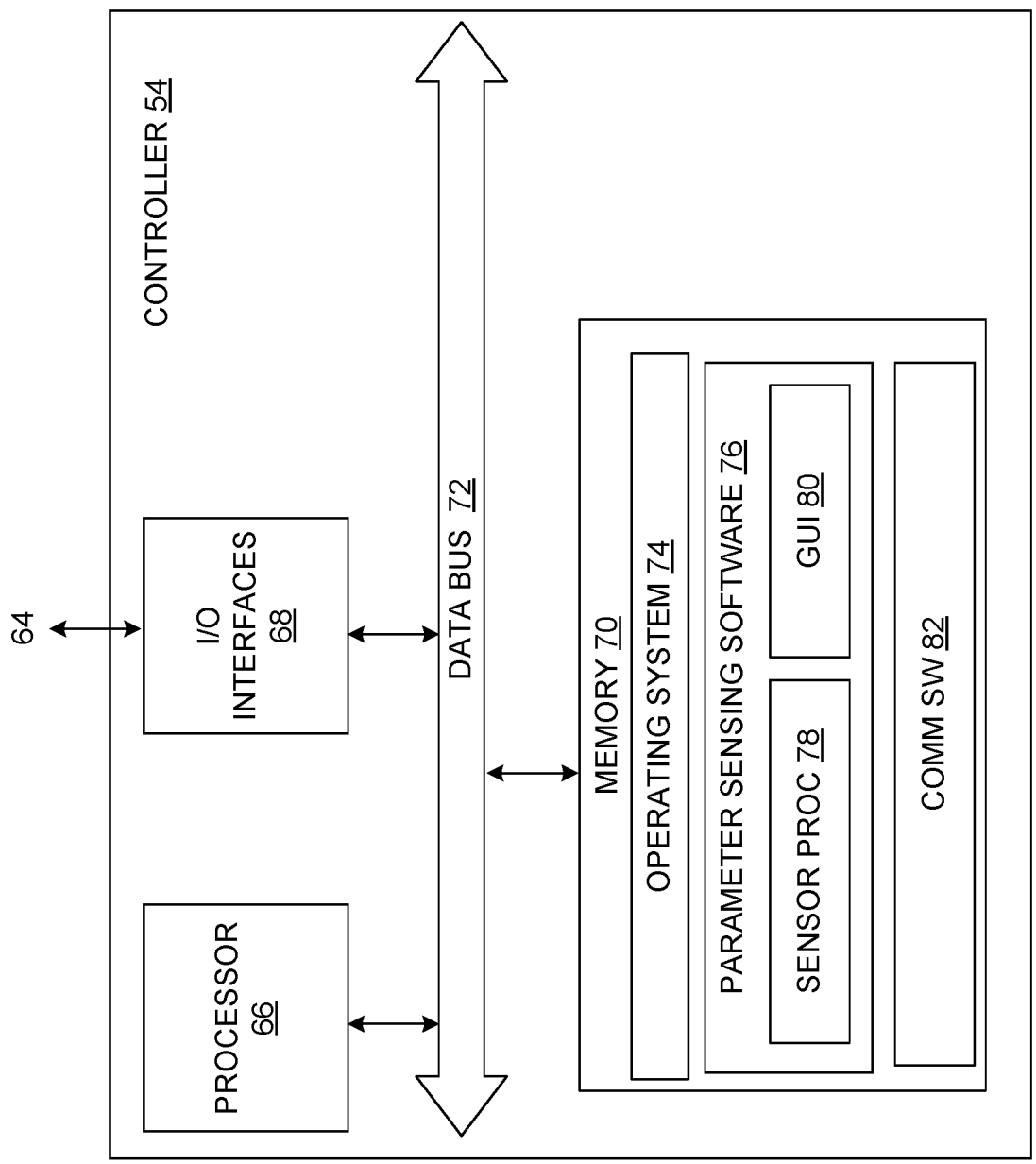
FIG. 6B is a block diagram that illustrates an embodiment of an example controller for the control system of FIG. 6A.

Referring more particularly to the controller 54, attention is directed to FIG. 6B, which shows an embodiment of an example controller 54. One having ordinary skill in the art should appreciate in the context of the present disclosure that the example controller 54 is merely illustrative, and that some embodiments of controllers may comprise fewer or additional components, and/or some of the functionality associated with the various components depicted in FIG. 6B may be combined, or further distributed among additional modules, in some embodiments. It should be appreciated that, though described in the context of residing in the windrower 10 (FIG. 1), in some embodiments, the controller 54, or all or a portion of its corresponding functionality, may be implemented in a computing device or system located external to the windrower 10. Referring to FIG. 6B, with continued reference to FIG. 6A, the controller 54 or electronic control unit (ECU) is depicted in this example as a computer, but may be embodied as a programmable logic controller (PLC), field programmable gate array (FPGA), application specific integrated circuit (ASIC), among other devices. It should be appreciated that certain well-known components of computers are omitted here to avoid obfuscating relevant features of the controller 54. In one embodiment, the controller 54 comprises one or more processors (also referred to herein as processor units or processing units), such as processor 66, input/output (I/O) interface(s) 68, and memory 70, all coupled to one or more data busses, such as data bus 72. The memory 70 may include any one or a combination of volatile memory elements (random-access memory RAM, such as DRAM, and SRAM, etc.) and nonvolatile memory elements (e.g., ROM, Flash, hard drive, EPROM, EEPROM, CDROM, etc.). The memory 70 may store a native operating system, one or more native applications, emulation systems, or emulated applications for any of a variety of operating systems and/or emulated hardware platforms, emulated operating systems, etc.

In the embodiment depicted in FIG. 6B, the memory 70 comprises an operating system 74, parameter sensing software 76, which includes a sensor processing component 78 and a graphical user interface (GUI) component 80. The memory 70 further comprises communications software 82. It should be appreciated that in some embodiments, additional or fewer software modules (e.g., combined functionality) may be deployed in the memory 70 or additional memory. For instance, memory 70 may include guided steering software, among other software. In some embodiments, a separate storage device may be coupled to the data bus 72, such as a persistent memory (e.g., optical, magnetic, and/or semiconductor memory and associated drives).

The parameter sensing software 76 receives signals from the sensors 50 and processes the sensor input using the sensor processing component 78 and provides operator feedback via GUI component 80. For instance, the sensor processing component 78 may perform averaging, smoothing, noise mitigation, etc., and determine the moisture content of the soil based on the data. The GUI component 80 may be used to provide feedback of the moisture content, and provide setting adjustment recommendations or other recommendations relevant to proper farm management (e.g., dry-down recommendations, cautions about proceeding based on potential harm to the plant health, etc.). In some embodiments, the parameter sensing software 76 may communicate to various machine controls (and/or machine control software), including the control components 62, to trigger machine setting adjustments based on the detected soil moisture. In some embodiments, moisture content may be communicated for a given field (or locations within a field, such as based on accompanying GNSS position or triangulation data) to a remote site via the communications interface 60 as controlled and managed by the communications software 82. The signals to be communicated may be provided to the communications interface 60 via the I/O interfaces 68 and network 64.

Execution of the parameter sensing software 76 (e.g., including the sensor processing component 78 and GUI 80) and communications software 82 may be implemented by the processor 66 under the management and/or control of the operating system 74. The processor 66 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 54.

The I/O interfaces 68 provide one or more interfaces to the network 64 and other networks. In other words, the I/O interfaces 68 may comprise any number of interfaces for the input and output of signals (e.g., analog or digital data) for conveyance of information (e.g., data) over the network 64.

When certain embodiments of the controller 54 are implemented at least in part with software (including firmware), as depicted in FIG. 6B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 54 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. A header, comprising:
a frame comprising a cutting assembly; and
a skid plate coupled to the frame, the skid plate comprising an upper surface and an opposing ground engaging surface, wherein the ground engaging surface comprises a protrusion extending away from the upper surface beyond a plane of the ground engaging surface, the protrusion comprising one or more optical windows extending beyond the plane of the ground engaging surface, each of the one or more optical windows comprising an optically transparent material.

2. The header of claim 1, wherein the protrusion extends no more than approximately 0.25 inches to 1.0 inches from the plane of the ground engaging surface.

3. The header of claim 1, wherein the protrusion extends longitudinally along at least a portion of a length of the skid plate.

4. The header of claim 1, wherein the upper surface further comprises a socket configured as a volume that includes on one side the one or more optical windows.

5. The header of claim 4, further comprising an optical sensor occupying the volume and configured to transmit light, and receive reflected light, through one of the one or more optical windows.

6. The header of claim 4, further comprising plural optical sensors occupying the volume and each configured to transmit light, and receive reflected light, through plural optical windows of the one or more optical windows.

7. A header, comprising:
a frame comprising a cutting assembly; and
a skid plate coupled to the frame, the skid plate comprising an upper surface and an opposing ground engaging surface, the ground engaging surface comprising plural optical windows flush or extending beyond a plane of the ground engaging surface, each of the optical windows comprising an optically transparent material, wherein the upper surface further comprises a socket configured as a volume that includes on one side of the optical windows;
plural optical sensors occupying the volume and each configured to transmit light, and receive reflected light, through the plural optical windows, wherein the volume comprises a partitioned volume for each of the plural optical sensors.

8. The header of claim 1, further comprising one or more additional skid plates, wherein at least one of the one or more additional skid plates comprises an upper surface and an opposing ground engaging surface, the ground engaging surface of the at least one additional skid plate comprising one or more optical windows extending beyond a plane of the ground engaging surface, each of the one or more optical windows of the at least one additional skid plate comprising an optically transparent material, wherein the upper surface of the at least one additional skid plate further comprises a socket configured as a volume that includes on one side the one or more optical windows of the at least one additional skid plate, further comprising one or more optical sensors occupying the volume and configured to transmit light, and receive reflected light, through the one or more optical windows.

9. The header of claim 1, wherein the upper surface further comprises plural sockets, each configured as a volume that includes on one side one of the one or more optical windows.

10. The header of claim 9, further comprising plural optical sensors occupying the volumes of the plural sockets and each of the optical sensors configured to transmit light, and receive reflected light, through plural optical windows of the one or more optical windows.

11. A skid plate sensor system, comprising:
a skid plate comprising an upper surface and an opposing ground engaging surface, the ground engaging surface comprising one or more optical windows flush or extending away from the upper surface beyond a plane of the ground engaging surface, each comprising an optically transparent material, wherein the ground engaging surface comprises a protrusion extending beyond the plane of the ground engaging surface, the protrusion comprising the one or more optical windows; and
one or more sensors configured to transmit light, and receive reflected light, through the one or more optical windows.

12. The skid plate sensor system of claim 11, further comprising a controller, the controller configured to receive signals from the one or more sensors and determine a moisture content of soil which the skid plate is configured to engage.

13. The skid plate of claim 11, wherein the protrusion extends no more than approximately 0.25 inches to 1.0 inches from the plane of the ground engaging surface.

14. The skid plate of claim 11, wherein the protrusion extends longitudinally along at least a portion of a length of the skid plate.

* * * * *